US008963523B2

(12) United States Patent
Wang

(10) Patent No.: US 8,963,523 B2
(45) Date of Patent: Feb. 24, 2015

(54) SWITCHING REGULATOR WITH ERROR CORRECTION AND CONTROL METHOD THEREOF

(71) Applicant: Chengdu Monolithic Power Systems, Inc., Chengdu (CN)

(72) Inventor: Rui Wang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 127 days.

(21) Appl. No.: 13/710,091

(22) Filed: Dec. 10, 2012

(65) Prior Publication Data
US 2013/0147454 A1 Jun. 13, 2013

(30) Foreign Application Priority Data

Dec. 9, 2011 (CN) .......................... 2011 1 0408375

(51) Int. Cl.
G05F 1/00 (2006.01)
G05F 1/618 (2006.01)
H02M 3/158 (2006.01)

(52) U.S. Cl.
CPC ............. *G05F 1/618* (2013.01); *H02M 3/1588* (2013.01); *Y02B 70/1466* (2013.01)

USPC .......................................... 323/282; 323/285

(58) Field of Classification Search
USPC .................. 323/222, 271, 282–285
See application file for complete search history.

(56) References Cited

U.S. PATENT DOCUMENTS

| 5,912,552 A * | 6/1999 | Tateishi ......................... 323/285 |
| 7,508,181 B2 * | 3/2009 | Chen et al. ..................... 323/282 |
| 8,410,769 B2 * | 4/2013 | Lopata et al. .................. 323/284 |
| 2002/0024826 A1 * | 2/2002 | Katayama ..................... 363/21.1 |
| 2012/0081085 A1 * | 4/2012 | Miyamae ...................... 323/271 |
| 2012/0119718 A1 * | 5/2012 | Song ............................. 323/282 |

* cited by examiner

*Primary Examiner* — Nguyen Tran
(74) *Attorney, Agent, or Firm* — Perkins Coie LLP

(57) ABSTRACT

A switching regulator configured to provide an output voltage comprises a power stage, an error correction circuit, a comparator, an ON-time generator and a logic circuit. The error correction circuit generates an error correction voltage based on a reference voltage and a feedback voltage representative of the output voltage. The comparator compares the feedback voltage with the difference between the reference voltage and the error correction voltage, and generates a comparison signal. The ON-time generator is configured to provide an ON-time signal. The logic circuit generates a logic control signal to control the power stage based on the comparison signal and the ON-time signal.

9 Claims, 7 Drawing Sheets

SWITCHING REGULATOR WITH ERROR CORRECTION AND CONTROL METHOD THEREOF

CROSS-REFERENCE TO RELATED APPLICATION(S)

This application claims the benefit of CN application 201110408375.8, filed on Dec. 9, 2011, and incorporated herein by reference.

TECHNICAL FIELD

Embodiments of the present invention generally relate to switching regulators, and more particularly but not exclusively to switching regulators including an error correction circuit.

BACKGROUND

In all the control schemes of switching regulators, constant ON-time (COT) control scheme is widely used because of its many advantages. In COT control scheme, loop compensation is not needed, so the design of the switching regulator is simple. Moreover, the transient response of the switching regulator is fast since no error amplifier is needed to adjust the voltage. In addition, if the switching regulator operates in pulse frequency modulation (PFM) mode at light load, and switches to pulse width modulation (PWM) mode at heavy load, the transition between the PFM mode and PWM mode is also smoother by using the COT scheme. Because the COT control scheme has the foregoing advantages but not limited to them, it can be used widely in the applications of the power control for switching regulators.

In most applications, a comparator is used for comparing a feedback voltage $V_{FB}$ reflecting the output voltage $V_{OUT}$ of the switching regulator with a reference voltage $V_{REF}$. Based on the comparison result, the switching regulator controls a power stage to adjust the output voltage $V_{OUT}$ of the switching regulator.

FIG. 1 illustrates a prior buck switching regulator 10. As shown in FIG. 1, a feedback circuit consisting of resistors $R_{D1}$ and $R_{D2}$ is used to convert the output voltage $V_{OUT}$ of the switching regulator 10 into the feedback voltage $V_{FB}$ that is provided to the inverting input terminal of the comparator COMP. The non-inverting input terminal of the comparator COMP is configured to receive an actual reference voltage $V_R$ provided by a reference voltage source $V_{REF}$. If the output voltage $V_{OUT}$ decreases, the feedback voltage $V_{FB}$ will also decrease. When the feedback voltage $V_{FB}$ is decreased to be smaller than the actual reference voltage $V_R$, the comparator COMP generates a high level signal to set the flip-flop 14. The high side switch $Q_1$ is turned on and the low side switch $Q_2$ is turned off. The output voltage $V_{OUT}$ increases.

After a constant ON-time $T_{ON}$, a high level signal is generated by a COT generator 13 to reset the flip-flop 14. The high side switch $Q_1$ is turned off and the low side switch $Q_2$ is turned on. The feedback voltage $V_{FB}$ as well as the output voltage $V_{OUT}$ deceases. When the feedback voltage $V_{FB}$ is decreased to be smaller than the actual reference voltage $V_R$, the comparator COMP generates a high level signal to set the flip-flop 14, then the output voltage $V_{OUT}$ increases. The foregoing operation is repeated in the next working period.

FIG. 2 illustrates several working waveforms of the buck switching regulator 10 shown in FIG. 1. As shown in FIG. 2, the several waveforms are a switching signal SW, an equivalent series resistance (ESR) ripple, a capacitor ripple CAP of the output capacitor $C_{OUT}$ and the output voltage. Because of the existence of the ESR ripple and the capacitor ripple CAP, the comparator COMP actually compares the valley of the output voltage with the reference voltage $V_{REF}$ in each working period. Suppose the relationship between the feedback voltage $V_{FB}$ and output voltage $V_{OUT}$ is:

$$V_{FB} = K \times V_{OUT} \tag{1}$$

wherein K is the scaling factor. And suppose the set value of the output voltage $V_{OUTS}$ is:

$$V_{OUTS} = \frac{1}{K} \times V_{REF} \tag{2}$$

There exists a voltage error $V_{OUTE}$ between the actual output voltage $V_{OUTR}$ and the set value of the output voltage $V_{OUTS}$. For applications with small output voltage, such as DSP/CPU/Memory power supplies, the voltage error $V_{OUTE}$ generated by the output voltage ripple will seriously affect the output voltage accuracy of the switching regulator. For example, if the set value of the output voltage $V_{OUTS}$ is 1V and the amplitude of the output voltage ripple is 50 mV, the actual output voltage $V_{OUTR}$ is 2.5% higher than the set value of the output voltage $V_{OUTS}$.

SUMMARY

Embodiments of the present invention are directed to a switching regulator configured to provide an output voltage, comprising a power stage, an error correction circuit, a comparator and an ON-time generator and a logic circuit. The error correction circuit generates an error correction voltage based on a reference voltage and a feedback voltage representative of the output voltage. The comparator compares the feedback voltage with the difference between the reference voltage and the error correction voltage, and generates a comparison signal. The ON-time generator is configured to provide an ON-time signal. The logic circuit generates a logic control signal to control the power stage based on the comparison signal and the ON-time signal. The accuracy of the output voltage is improved by making use of the error correction circuit.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
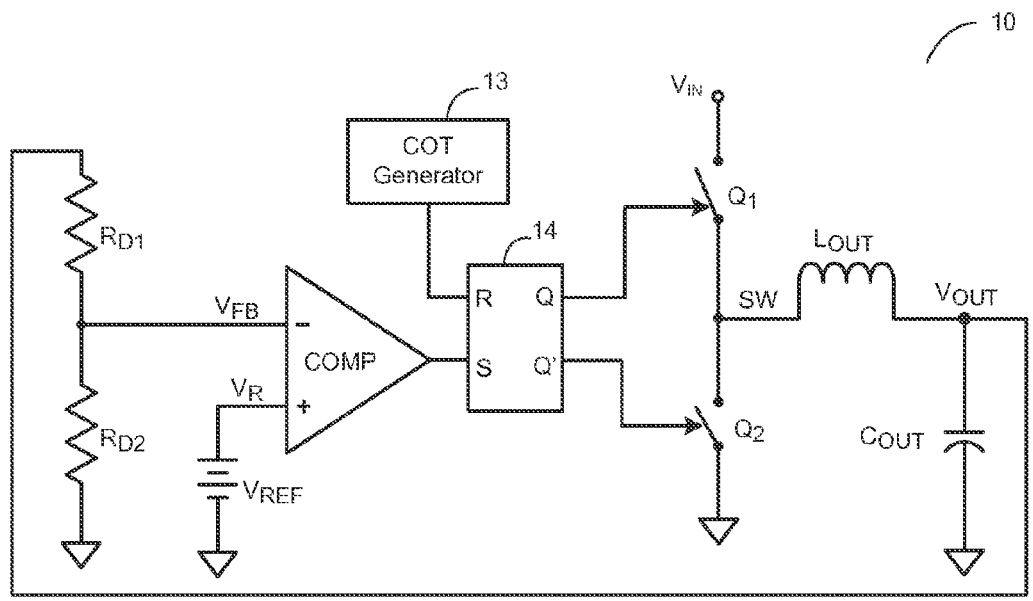
FIG. 1 illustrates a prior buck switching regulator 10.
Figure 2:
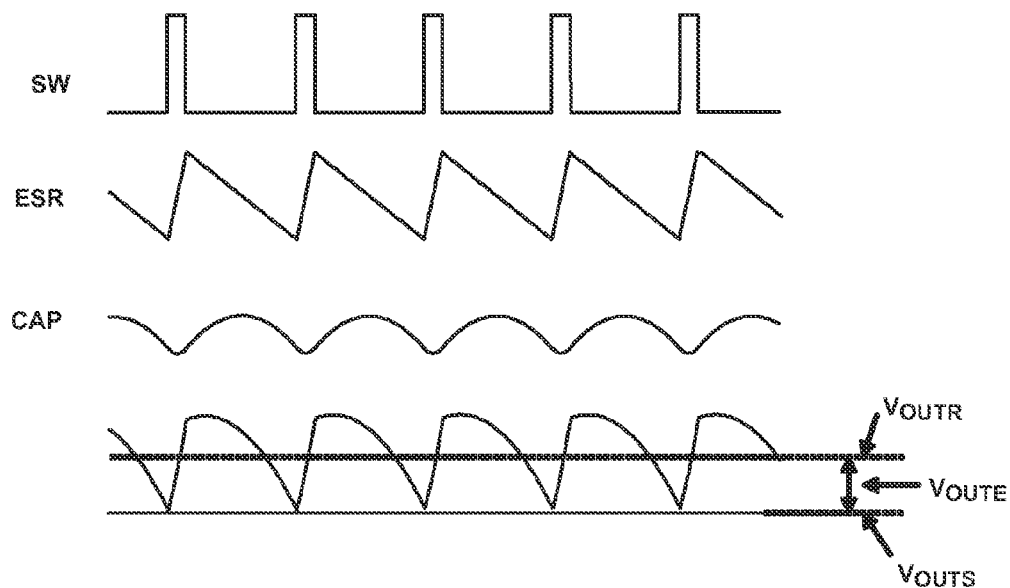
FIG. 2 illustrates several working waveforms of the buck switching regulator 10 shown in FIG. 1.
Figure 3:
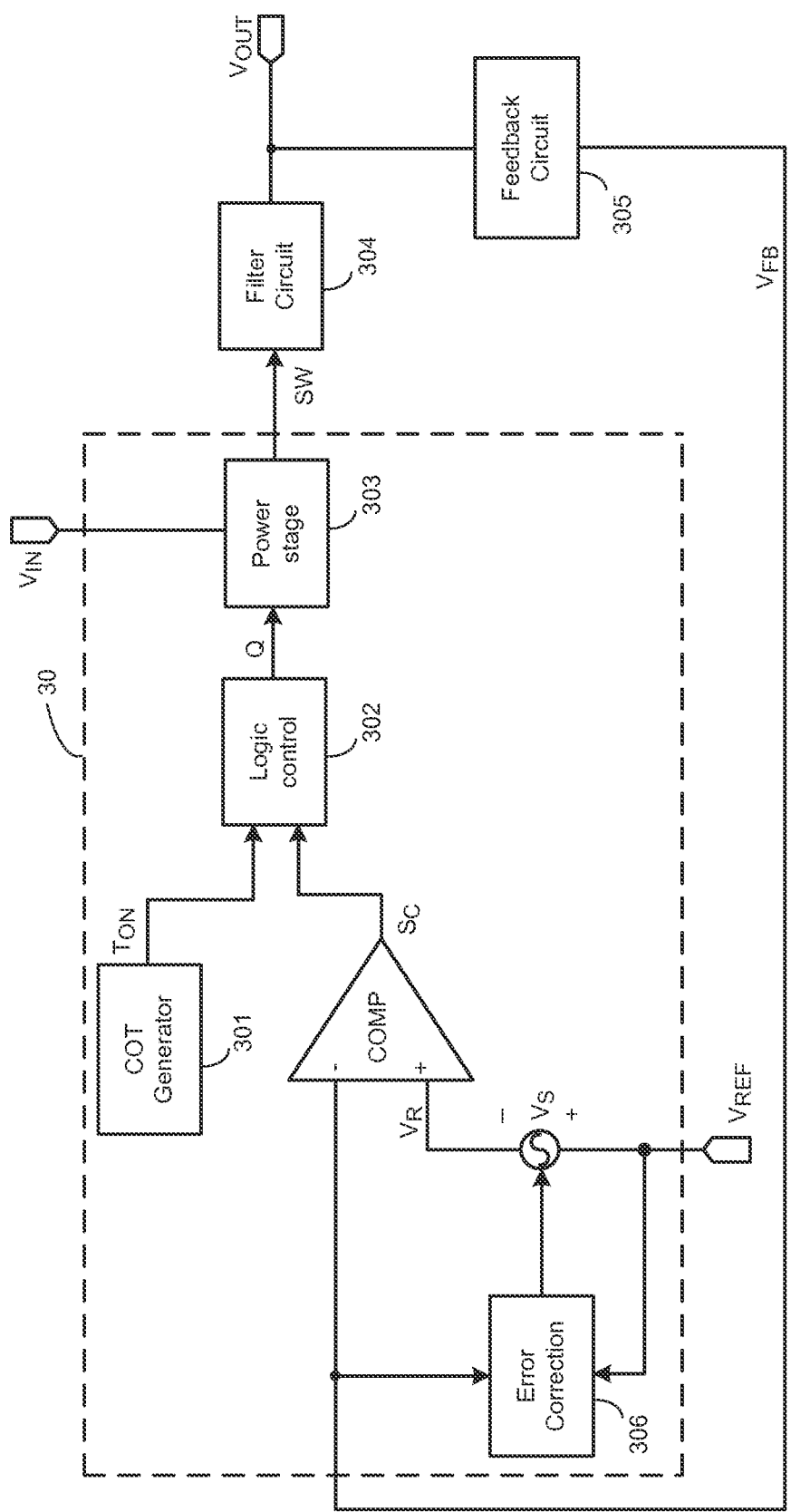
FIG. 3 is a block diagram of a switching regulator 30 in accordance with an embodiment of the present invention.

FIG. 3 is a block diagram of a switching regulator 30 in accordance with an embodiment of the present invention. As shown in FIG. 3, the switching regulator 30 comprises a constant ON-Lime (COT) generator 301, a logic circuit 302, a power stage 303 and an error correction circuit 306.

The COT generator 301 is configured to provide an ON-time signal $T_{ON}$. The logic circuit 302 is configured to receive the ON-time signal $T_{ON}$ and provide a logic control signal Q. The power stage 303 is configured to receive the input voltage $V_{IN}$ and the logic control signal Q, and to provide a switching signal SW. As shown in FIG. 3, a filter 304 is configured to receive the switching signal SW and to provide an output voltage $V_{OUT}$. A feedback circuit 305 receives the output voltage $V_{OUT}$ and generates a feedback voltage $V_{FB}$ representative of the output voltage $V_{OUT}$. The error correction circuit 306 is configured to receive the feedback voltage $V_{FB}$ and a reference voltage $V_{REF}$, and to provide an error correction voltage $V_S$. For clarity, as shown in FIG. 3, a voltage source is used to represent the error correction voltage $V_S$. The anode of the voltage source is connected to the reference voltage $V_{REF}$, the cathode of the voltage source is connected to the non-inverting input terminal of the comparator COMP to provide the actual reference voltage $V_R$. Therefore, the actual reference voltage $V_R$ is the difference between the reference voltage $V_{REF}$ and the error correction voltage $V_S$, that is $V_R=V_{REF}-V_S$. The inverting input terminal of the comparator COMP is configured to receive the feedback voltage $V_{FB}$ and provide a comparison signal $S_C$ to the logic circuit 302.

Figure 4:
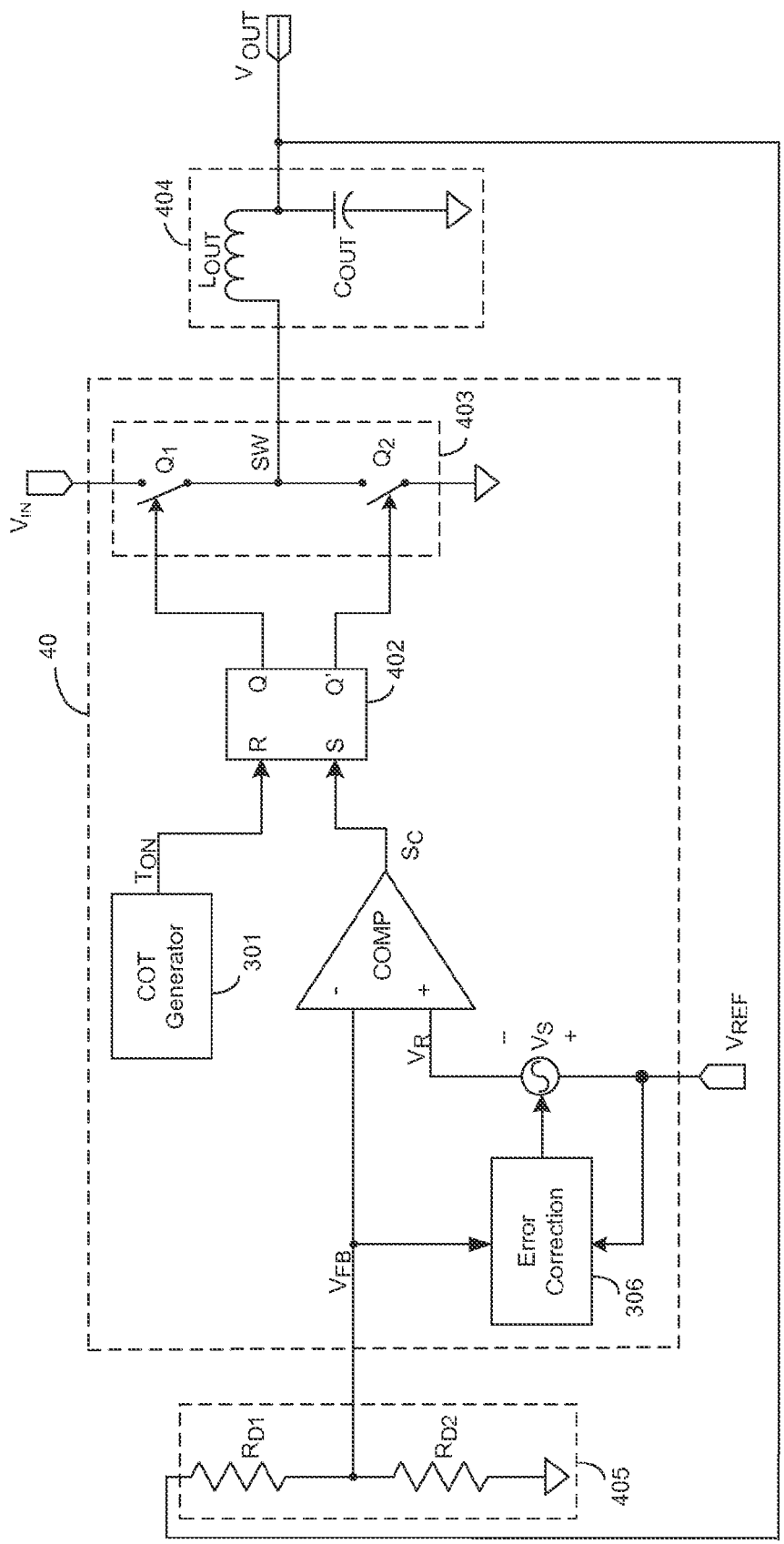
FIG. 4 schematically illustrates a switching regulator in accordance with an embodiment of the present invention.

FIG. 4 schematically illustrates a switching regulator 40 in accordance with an embodiment of the present invention. As shown in FIG. 4, the logic circuit 302 shown in FIG. 3 comprises a flip-flop 402, the set terminal S of the flip-flop is configured to receive the comparison signal $S_C$, the reset terminal R of the flip-flop is configured to receive the ON-time signal $T_{ON}$. The flip-flop provide the logic control signal Q and the inverting logic control signal Q' at its output terminals. The power stage 303 shown in FIG. 3 comprises a pair of switches 403 consisting of a high side switch $Q_1$ and a low side switch $Q_2$. The high side switch $Q_1$ has a first terminal, a second terminal and a control terminal, wherein the first terminal is connected to the input voltage $V_{IN}$, the second terminal is connected to the low side switch $Q_2$, and the control terminal is configured to receive the logic control signal Q. The low side switch $Q_2$ has a first terminal, a second terminal and a control terminal, wherein the first terminal is connected to the second terminal of the high side switch $Q_1$, the second terminal is grounded and the control terminal is configured to receive the inverting logic control signal Q'. The common node of the high side and the low side switches is configured to provide the switching signal SW. The filter 304 shown in FIG. 3 comprises a LC filter 404. As shown in FIG. 4, the LC filter 404 comprises an inductor $L_{OUT}$ and a capacitor $C_{OUT}$. The inductor $L_{OUT}$ has a first terminal and a second terminal, wherein the first terminal is connected to the common node of the high side and the low side switches. The capacitor $C_{OUT}$ has a first terminal connected to the second terminal of the inductor $L_{OUT}$ and a second terminal grounded. The common node of the inductor $L_{OUT}$ and the capacitor $C_{OUT}$ is configured to provide the output voltage $V_{OUT}$. The feedback circuit 305 shown in FIG. 3 comprises a voltage divider 405 consisting of resistors $R_{D1}$ and $R_{D2}$. The resistor $R_{D1}$ has a first terminal and a second terminal, wherein the first terminal is connected to the common node of the inductor $L_{OUT}$ and the capacitor $C_{OUT}$. The resistor $R_{D2}$ has a first terminal and a second terminal. Wherein the first terminal is connected to the second terminal of the resistor $R_{D1}$ and the second terminal is grounded. The common node of the resistors $R_{D1}$ and $R_{D2}$ is connected to the inverting input terminal of the comparator COMP.

Figure 5:
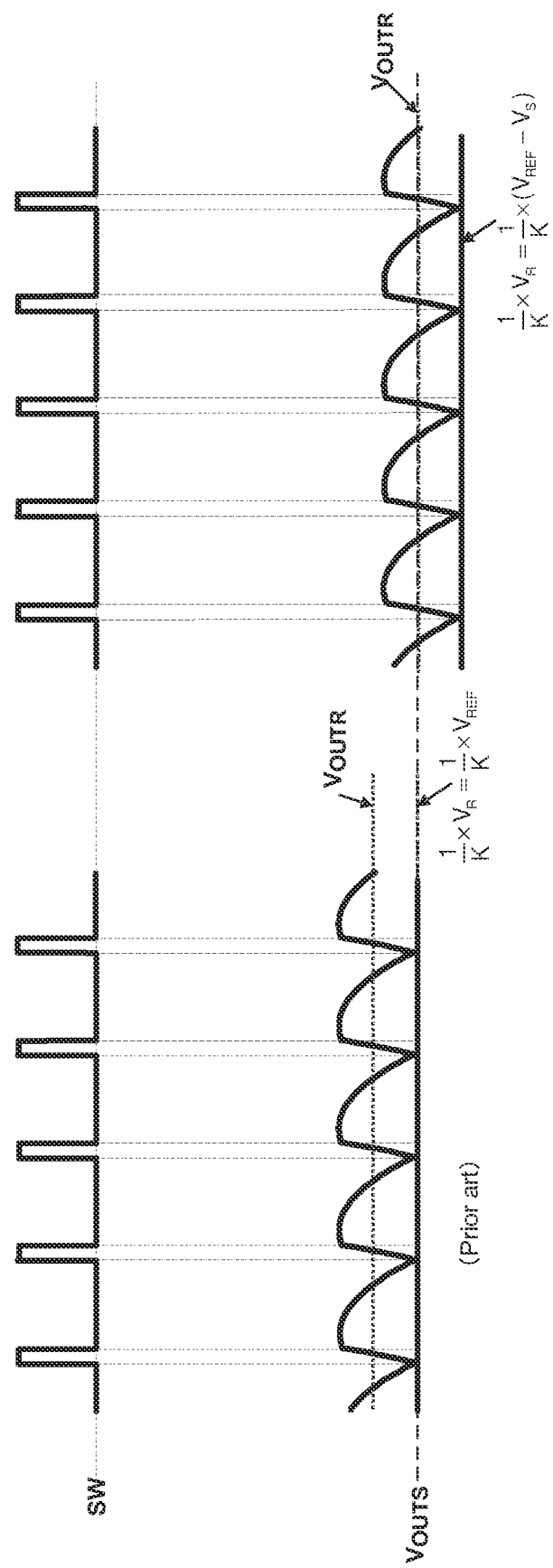
FIG. 5 illustrates the waveform of the output voltage of the switching regulator 30 shown in FIG. 3 compared with that of the prior art.

FIG. 5 illustrates the waveform of the output voltage of the switching regulator 30 shown in FIG. 3 compared with that of the prior art. As shown in FIG. 5, the actual reference voltage $V_R$ of the switching regulator 30 is decreased compared with that of the prior art. So, only when the valley of the output voltage $V_{OUT}$ is decreased to be smaller than 1/K times of the decreased actual reference voltage $V_R$, the comparator COMP can provide a high level signal to the logic circuit 302 to increase the output voltage $V_{OUT}$. Therefore, the actual output voltage $V_{OUTR}$ and the set value of the output voltage $V_{OUTS}$ are adjusted to be substantially equal by the switching regulator 30 and the error is eliminated.

Figure 6:
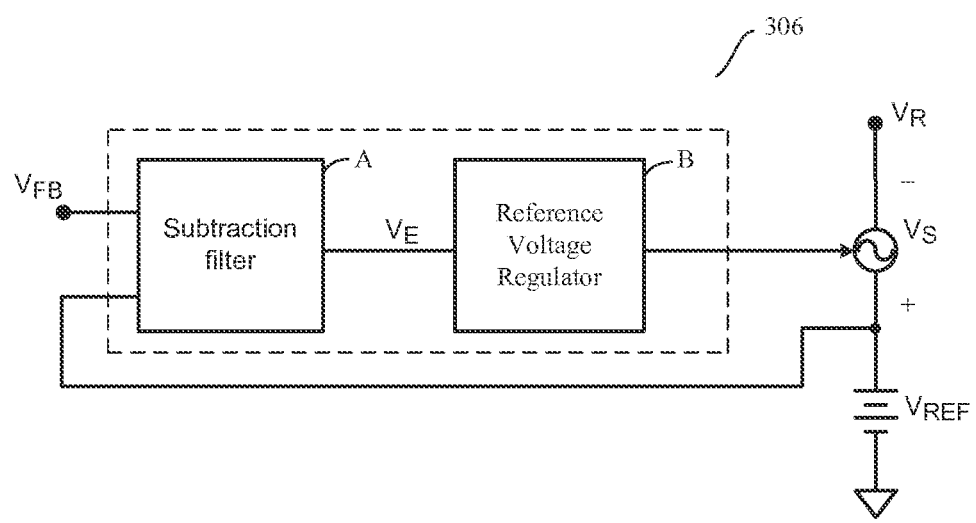
FIG. 6 illustrates an error correction circuit in accordance with one embodiment of the present invention.

FIG. 6 illustrates an error correction circuit in accordance with one embodiment of the present invention. As shown in FIG. 6, the error correction circuit 306 comprises a subtracting and filtering circuit A and a reference voltage regulator B. The subtracting and filtering circuit A is configured to receive the feedback voltage $V_{FB}$ and the reference voltage $V_{REF}$, and to provide a subtracting and filtering signal $V_E$. The reference voltage regulator B is configured to receive the subtracting and filtering signal $V_E$, and to provide the error correction voltage $V_S$.

The error correction voltage $V_S$ provided by the error correction voltage 306 shown in FIG. 6 is in series with the reference voltage $V_{REF}$ to obtain the actual reference voltage $V_R$. The actual reference voltage $V_R$ equals the difference between the reference voltage $V_{REF}$ and the error correction voltage $V_S$, that is $V_R=V_{REF}-V_S$. The comparator COMP compares the feedback voltage $V_{FB}$ with the actual reference voltage $V_R$, so the output voltage $V_{OUT}$ of the switching regulator is adjusted more accurately.

Figure 7:
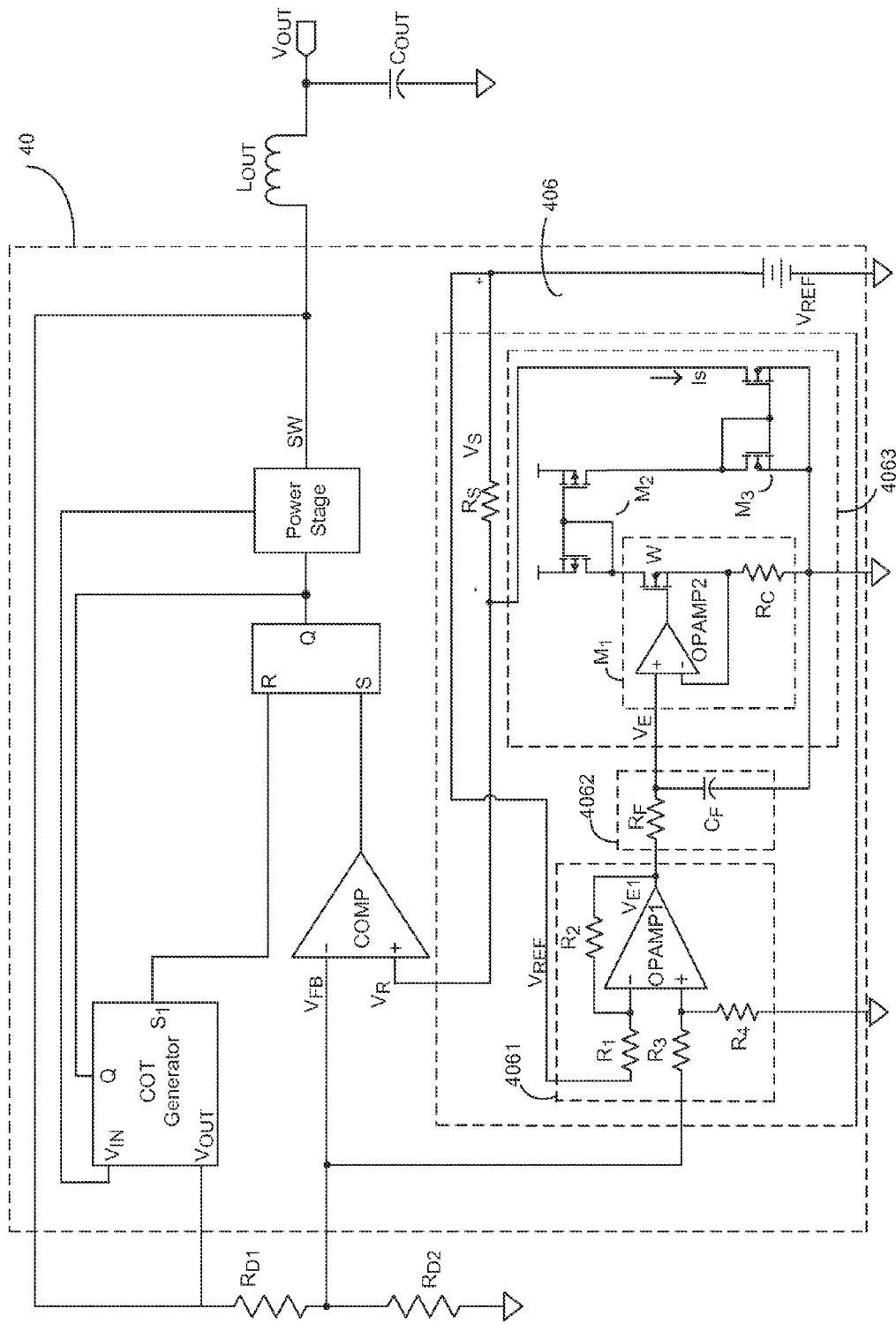
FIG. 7 illustrates a switching regulator 40 in accordance with one embodiment of the present invention.

FIG. 7 illustrates a switching regulator 40 in accordance with one embodiment of the present invention. As shown in FIG. 7, the switching regulator 40 comprises an error correction circuit 406. The error correction circuit 406 is configured to receive a feedback voltage $V_{FB}$ and a reference voltage $V_{REF}$, and to provide an error correction voltage $V_S$ based on the feedback voltage $V_{FB}$ and the reference voltage $V_{REF}$. The error correction circuit 406 comprises a subtracting circuit 4061, a low-pass filter 4062 and a reference voltage regulator 4063. The subtracting circuit. 4061 and the low-pass filter 4062 are combined to form a subtracting and filtering circuit.

The subtracting circuit 4061 comprises the resistors $R_1$~$R_4$ and an operational amplifier OPAMP1. The resistor $R_1$ has a first terminal configured to receive the reference voltage $V_{REF}$ and a second terminal coupled to the inverting input terminal of the operational amplifier OPAMP1. The resistor $R_2$ has a first terminal coupled to the second terminal of the resistor $R_1$ and a second terminal coupled to the output terminal of the operational amplifier OPAMP1. The resistor $R_3$ has a first terminal configured to receive the feedback voltage $V_{FB}$ and a second terminal coupled to the non-inverting input terminal of the operational amplifier OPAMP1. The resistor $R_4$ has a first terminal coupled to the second terminal of the resistor $R_3$ and the second terminal grounded. The output terminal of the operational amplifier OPAMP1 is configured to provide a subtracting signal $V_{E1}$.

The low-pass filter 4062 comprises a filter resistor $R_F$ and a filter capacitor $C_F$. The filter resistor $R_F$ has a first terminal and a second terminal, wherein the first terminal is configured to receive the subtracting signal $V_{E1}$. The filter capacitor $C_F$ has a first terminal coupled to the second terminal of the filter resistor RE and a second terminal grounded. The common node of the filter capacitor $C_F$ and the filter resistor $R_F$ is configured as the output terminal of the low-pass filter 4062 to provide the subtracting and filtering signal $V_E$.

The reference voltage regulator 4063 comprises a reference current generator $M_1$, a first current mirror $M_2$, a second current mirror $M_3$ and an error correction resistor $R_S$. The reference current generator $M_1$ is configured to receive the subtracting and filtering signal $V_E$ and to provide a reference current. The first current mirror $M_2$ is configured to receive the reference current and to provide a first current. The second current mirror $M_3$ is configured to receive the first current and to provide a second current $I_S$ at its output terminal. The error correction resistor $R_S$ has a first terminal and a second terminal. The first terminal is coupled to the output terminal of the second current mirror $M_3$ and the non-inverting input terminal of the comparator COMP, and the second terminal is connected to the reference voltage $V_{REF}$.

In one embodiment, the reference current generator $M_1$ comprises an operational amplifier OPAMP2, a linear voltage regulating component W and a reference resistor $R_C$. The operational amplifier OPAMP2 has a non-inverting terminal, an inverting terminal and an output terminal. The non-inverting terminal of the operational amplifier OPAMP2 is configured to receive the subtracting and filtering signal $V_E$. The linear voltage regulating component W has first terminal, a second terminal and a control terminal, wherein the control terminal is coupled to the output terminal of the operational amplifier OPAMP2, the first terminal is coupled to the input terminal of the first current mirror $M_2$, the second terminal is coupled to the inverting input terminal of the operational amplifier OPAMP2. The reference resistor $R_C$ has a first terminal coupled to the inverting input terminal of the operational amplifier OPAMP2 and a second terminal grounded.

As shown in FIG. 7, the resistance of the resistors $R_1$ and $R_3$ in the subtracting circuit 4061 may be substantially equal. And the resistance of the resistors $R_2$ and $R_4$ may be substantially equal. That is $R_1=R_3$, $R_2=R_4$. Based on the working principle of the subtracting circuit, the relationship between the subtracting signal $V_{E1}$ generated by the subtracting circuit 4061, the feedback voltage $V_{FB}$ and the reference voltage $V_{REF}$ is expressed as equation (3):

$$V_{E1} = \frac{R_2}{R_1}(V_{FB} - V_{REF}) \tag{3}$$

The subtracting signal $V_{E1}$ is converted to the subtracting and filtering signal $V_E$ via the low-pass filter 4062. Because the output voltage $V_{OUT}$ contains ripple, the subtracting signal $V_{E1}$ also contains ripple. The ripple in the subtracting signal $V_{E1}$ is eliminated by the low-pass filter 4062. That means the subtracting and filtering signal $V_E$ no longer contains ripple.

As shown in FIG. 7, the reference current generator $M_1$ in the reference voltage regulator 4063 is configured to receive the subtracting and filtering signal $V_E$ and to produce the reference current. The reference current can be calculated as:

$$I_{REF} = \frac{V_E}{R_C} \tag{4}$$

Through the regulation of the first current mirror $M_2$ and the second current mirror $M_3$, the second current $I_S$ provided at the output terminal of the second current mirror $M_3$ equals $I_{REF}$. The second current $I_S$ flows from the second terminal to the first terminal of the error correction resistor $R_S$. Therefore, the error correction voltage $V_S$ can be obtained from the error correction resistor $R_S$:

$$V_S = I_{REF} \times R_S \tag{5}$$

The first terminal of the error correction resistor $R_S$ is coupled to the non-inverting input terminal of the comparator COMP, the second terminal of the error correction resistor $R_S$ is coupled to the reference voltage $V_{REF}$.

Figure 8:
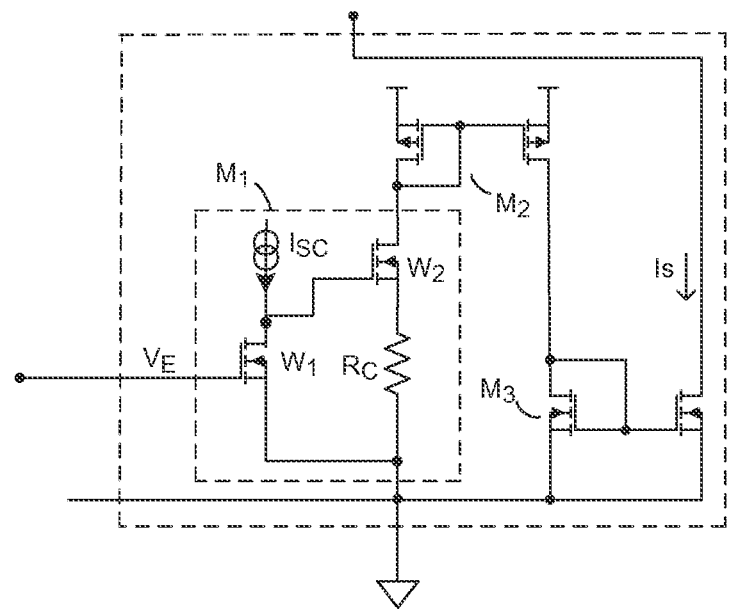
FIG. 8 schematically illustrates a reference current generator in accordance with an embodiment of the present invention.

FIG. 8 schematically illustrates a reference current generator in accordance with an embodiment of the present invention. In the embodiment shown in FIG. 8, the reference current generator comprises a current source $I_{SC}$, a first linear voltage regulating component $W_1$, a second linear voltage regulating component $W_2$ and a reference resistor $R_C$. The first linear voltage regulating component $W_1$ has a first terminal, a second terminal and a control terminal, wherein the control terminal is coupled to the output terminal of the subtracting and filtering circuit, the first terminal is coupled to the output terminal of the current source $I_{SC}$ and the second terminal is grounded. The second linear voltage regulating component $W_2$ has a first terminal, a second terminal and a control terminal, wherein the control terminal is coupled to the output terminal of the current source $I_{SC}$, the first terminal is coupled to the input terminal of the first current mirror $M_2$. The reference resistor $R_C$ has a first terminal coupled to the second terminal of the second linear voltage regulating component $W_2$ and a second terminal grounded.

As shown in FIG. 7, the actual reference voltage $V_R$ provided to the non-inverting input terminal of the comparator COMP can be expressed as equation (6):

$$V_R = V_{REF} - \frac{V_E}{R_C} \times R_S \tag{6}$$

Suppose the relationship between the actual reference voltage $V_R$, the feedback voltage $V_{FB}$ and the output voltage ripple $\Delta V$ is shown as equation (7):

$$V_{FB} = V_R + \Delta V \tag{7}$$

Based on the equations (3), (6) and (7), the feedback voltage $V_{FB}$ can be expressed as equation (8):

$$V_{FB} = V_{REF} + \frac{1}{1 + \frac{R_S}{R_C} \times \frac{R_2}{R_1}} \times \Delta V \tag{8}$$

The loop gain G can be expressed as:

$$G = \frac{R_S}{R_C} \times \frac{R_2}{R_1} \tag{9}$$

As shown in equation (9), the error correction circuit 406 is designed with the loop gain G. In ideal situation, when the loop gain G is infinity, the feedback voltage $V_{FB}$ equals the reference voltage $V_{REF}$ and is not affected by the output voltage ripple $\Delta V$. In actual applications, the greater the loop gain G, the smaller the effect of the output voltage ripple $\Delta V$ on the feedback voltage $W_E$. The output voltage $V_{OUT}$ substantially equals the set value of the output voltage $V_{OUTS}$, so the accuracy of the output voltage is improved.

Figure 9:
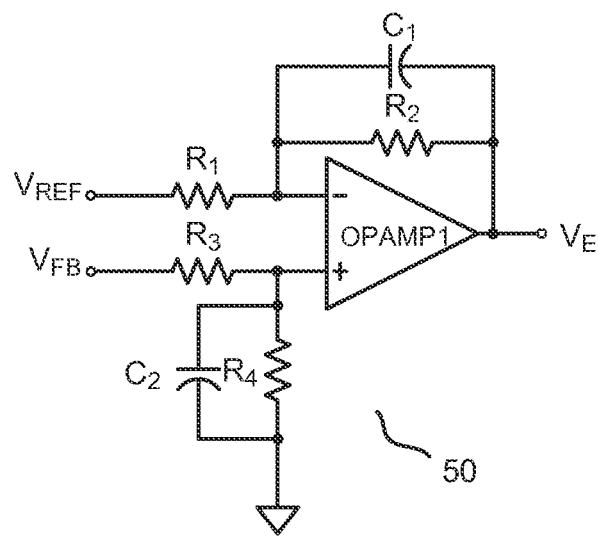
FIG. 9 schematically illustrates a subtracting and filtering circuit 50 in accordance with another embodiment of the present invention.

FIG. 9 schematically illustrates a subtracting and filtering circuit 50 in accordance with another embodiment of the present invention. As shown in FIG. 9, compared with the subtracting and filtering circuit shown in FIG. 6, capacitors $C_1$ and $C_2$ are respectively connected to the resistors $R_2$ and $R_4$ in parallel. The capacitor $C_1$ has a first terminal coupled to the first terminal of the resistor $R_2$ and a second terminal coupled to the second terminal of the resistor $R_2$. The capacitor $C_2$ has a first terminal coupled to the first terminal of the resistor $R_4$ and a second terminal coupled to the second terminal of the resistor $R_4$. The resistance of the resistors $R_1$ and $R_3$ may be substantially equal, the resistance of the resistors $R_2$ and $R_4$ may be substantially equal, and the capacitance of the capacitors $C_1$ and $C_2$ may be substantially equal.

As shown in FIG. 9, for the reference voltage $V_{REF}$, the corresponding error voltage $V_E'$ provided by the operational amplifier OPAMP1 can be expressed as equation (10):

$$V_E' = \frac{R_2 \| \frac{1}{SC_1}}{R_1} \cdot V_{REF} \quad (10)$$

wherein the symbol "$\|$" is used to indicate that the components on both sides of the symbol are parallel. For the feedback voltage $V_{FB}$, the corresponding error voltage $V_E''$ provided by the operational amplifier OPAMP1 can be expressed as equation (11):

$$V_E'' = \left(1 + \frac{R_2 \| \frac{1}{SC_1}}{R_1}\right) \left(\frac{R_4 \| \frac{1}{SC_2}}{R_3 + R_4 \| \frac{1}{SC_2}}\right) \cdot V_{FB} \quad (11)$$

Combining equations (10) and (11), the total error voltage (i.e. the subtracting and filtering signal $V_E$) provided by the operational amplifier OPAMP1 can be expressed as equation (11):

$$V_E = V_E' + V_E'' = \left(1 + \frac{\frac{R_2}{1+SC_1 \cdot R_2}}{R_1}\right) \cdot \left(\frac{\frac{R_4}{1+SC_2 \cdot R_4}}{R_3 + \frac{R_4}{1+SC_2 \cdot R_4}}\right) \cdot V_{FB} - \frac{\frac{R_2}{1+SC_1 \cdot R_2}}{R_1} \cdot V_{REF} \quad (12)$$

Because $R_1=R_3$, $R_2=R_4$ and $C_1=C_2$, equation (12) can be simplified into equation (13):

$$V_E = \frac{R_2}{R_1} \cdot \frac{1}{1+SC_1 \cdot R_2} (V_{FB} - V_{REF}) \quad (13)$$

As shown in equation (13), the subtraction of the feedback voltage $V_{FB}$ and the reference voltage $V_{REF}$ is realized by the subtracting and filtering circuit 50. The subtracting and filtering circuit 50 also has the function of filter because of the capacitors $C_1$ and $C_2$ integrated in ft. Since the capacitors $C_1$ and $C_2$ are integrated in the subtracting and filtering circuit 50, the cost as well as the size of the switching regulator is reduced.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A switching regulator configured to provide an output voltage, comprising:
    a power stage;
    an error correction circuit having a first input terminal, a second input terminal and an output terminal, wherein the first input terminal is configured to receive a feedback voltage representative of the output voltage, the second input terminal is configured to receive a reference voltage, and wherein based on the feedback voltage and the output voltage, the error correction circuit generates an error correction voltage at the output terminal;
    a comparator having a first input terminal, a second input terminal and an output terminal, wherein the first input terminal is configured to receive the feedback voltage, the second input terminal is configured to receive the difference between the reference voltage and the error correction voltage, and the output terminal is configured to provide a comparison signal;
    an ON-time generator configured to provide an ON-time signal;
    a logic circuit having a first input terminal, a second input terminal and an output terminal, wherein the first input terminal is coupled to the output terminal of the comparator to receive the comparison signal, the second input terminal is coupled to the ON-time generator to receive the ON-time signal, and wherein based on the comparison signal and the ON-time signal, the logic circuit generates a logic control signal to control the power stage;
    wherein the error correction circuit comprises:
        a subtracting and filtering circuit, having a first input terminal, a second input terminal and an output terminal, wherein the first input terminal and the second input terminal are configured to receive the feedback voltage and the reference voltage respectively, and wherein based on the feedback voltage and the reference voltage, the subtracting and filtering circuit generates a subtracting and filtering signal at the output terminal; and
        a reference voltage regulator having an input terminal and an output terminal, wherein the input terminal is coupled to the output terminal of the subtracting and filtering circuit to receive the subtracting and filtering signal, and wherein based on the subtracting and filtering signal, the reference voltage regulator generates the error correction voltage at the output terminal.

2. The switching regulator of claim 1, wherein the subtracting and filtering circuit comprises:
    a subtracting circuit, having a first input terminal, a second input terminal and an output terminal, wherein the first input terminal and the second input terminal are configured to receive the feedback voltage and the reference voltage respectively, and wherein based on the feedback voltage and the reference voltage, the subtracting circuit generates a subtracting signal at the output terminal; and a low-pass filter, having an input terminal and an output terminal, wherein the input terminal is coupled to the output terminal of the subtracting circuit to receive the subtracting signal, the low-pass filter generates the subtracting and filtering signal at the output terminal.

3. The switching regulator of claim 2, wherein the subtracting circuit comprises:

a first operational amplifier having a non-inverting input terminal, an inverting input terminal and an output terminal, wherein the output terminal is configured to provided the subtracting signal; and a first resistor, having a first terminal and a second terminal, wherein the first terminal is configured to receive the reference voltage and the second terminal is coupled to the inverting input terminal of the first operational amplifier;

a second resistor, having a first terminal and a second terminal, wherein the first terminal is coupled to the inverting input terminal of the first operational amplifier and the second terminal is coupled to the output terminal of the first operational amplifier;

a third resistor, having a first terminal and a second terminal, wherein the first terminal is configured to receive the feedback voltage and the second terminal is coupled to the non-inverting input terminal of the first operational amplifier; and a fourth resistor, having a first terminal and a second terminal, wherein the first terminal is coupled to the non-inverting input terminal of the first operational amplifier and the second terminal is grounded.

4. The switching regulator of claim 2, wherein the low-pass filter comprises:

a filtering resistor having a first terminal and a second terminal, wherein the first terminal is coupled to the output terminal of the subtracting circuit to receive the subtracting signal;

a filtering capacitor, having a first terminal and a second terminal, wherein the first terminal is coupled to the second terminal of the filtering resistor and the second terminal is grounded, wherein the first terminal of the filtering capacitor is used as the output terminal of the low-pass filter to provide the subtracting and filtering signal.

5. The switching regulator of claim 1, wherein the subtracting and filtering circuit comprises:

a first operational amplifier having a non-inverting input terminal, an inverting input terminal and an output terminal, wherein the output terminal is configured to provide a subtracting and filtering signal; and a first resistor having a first terminal and a second terminal, wherein the first terminal is configured to receive the reference voltage and the second terminal is coupled to the inverting input terminal of the first operational amplifier;

a second resistor having a first terminal and a second terminal, wherein the first terminal is coupled to the inverting input terminal of the first operational amplifier and the second terminal is coupled to the output terminal of the first operational amplifier;

a third resistor having a first terminal and a second terminal, wherein the first terminal is configured to receive the feedback voltage and the second terminal is coupled to the non-inverting input terminal of the first operational amplifier;

a fourth resistor having a first terminal and a second terminal, wherein the first terminal is coupled to the non-inverting input terminal of the first operational amplifier and the second terminal is grounded;

a first capacitor having a first terminal and a second terminal, wherein the first terminal is coupled to the inverting input terminal of the first operational amplifier and the second terminal is coupled to the output terminal of the first operational amplifier; and a second capacitor having a first terminal and a second terminal, wherein the first terminal is coupled to the non-inverting input terminal of the first operational amplifier and the second terminal is grounded.

6. The switching regulator of claim 1, wherein the reference voltage regulator comprises:

a reference current generator having an input terminal and an output terminal, wherein the input terminal is coupled to the output terminal of the subtracting and filtering circuit and the reference current generator generates a reference current at the output terminal;

a first current mirror having an input terminal and an output terminal, wherein the input terminal is coupled to the output terminal of the reference current generator;

a second current mirror having an input terminal and an output terminal, wherein the input terminal is coupled to the output terminal of the first current mirror; and an error correction resistor having a first terminal and a second terminal, wherein the first terminal is coupled to the output terminal of the second current mirror and the second input terminal of the comparator, wherein the second terminal is configured to receive the reference voltage, wherein the error correction resistor is configured to provide the error correction voltage.

7. The switching regulator of claim 6, wherein the reference current generator comprises:

a second operational amplifier having a non-inverting input terminal, an inverting input terminal and an output terminal, wherein the non-inverting input terminal is coupled to the output terminal of the subtracting and filtering circuit to receive the subtracting and filtering signal;

a reference resistor, having a first terminal and a second terminal, wherein the first terminal is coupled to the inverting input terminal of the second operational amplifier, and the second terminal is grounded; and a linear voltage regulating component having a first terminal, a second terminal and a control terminal, wherein the control terminal is coupled to the output terminal of the second operational amplifier, the first terminal is coupled to the input terminal of the first current mirror and the second terminal is coupled to the first terminal of the reference resistor.

8. The switching regulator of claim 6, wherein the reference current generator comprises:

a current source having an output terminal;

a first linear voltage regulating component having a control terminal, a first terminal and a second terminal, wherein the control terminal is coupled to the output terminal of the subtracting-and-filtering circuit to receive the subtracting and filtering signal, the first terminal is coupled to the output terminal of the current source, and the second terminal is grounded;

a second linear voltage regulating component having a control terminal, a first terminal and a second terminal, wherein the control terminal is coupled to the output terminal of the current source, the first terminal is coupled to the input terminal of the first current mirror; and a reference resistor having a first terminal and a second terminal, wherein the first terminal is coupled to the second terminal of the second linear voltage regulating component and the second terminal is grounded.

9. A method for controlling a switching regulator, wherein the switching regulator comprises a power stage and is configured to provide an output voltage, the method comprises:

generating an error correction voltage based on a feedback voltage representative of the output voltage and a reference voltage;

comparing the feedback voltage with the difference between the reference voltage and an error correction voltage, and generating a comparison signal;

generating a logic control signal to control the power stage based on the comparison signal and an ON-time signal;

wherein the step of generating the error correction voltage comprises:

subtracting the reference voltage from the feedback voltage, and generating a subtracting signal;

filtering the subtracting signal and generating a subtracting and filtering signal; and generating the error correction voltage based on the subtracting and filtering signal.

* * * * *